(12) United States Patent
Lapujade (10) Patent No.: US 10,004,126 B2
(45) Date of Patent: Jun. 19, 2018

(54) LIGHTING-SYSTEM COLOR-SHIFT DETECTION AND CORRECTION

(71) Applicant: Goodrich Lighting Systems, Inc., Phoenix, AZ (US)

(72) Inventor: Philippe Lapujade, Chandler, AZ (US)

(73) Assignee: Goodrich Lighting Systems, Inc., Phoenix, AZ (US)

( * ) Notice: Subject to any disclaimer, the term of this patent is extended or adjusted under 35 U.S.C. 154(b) by 111 days.

(21) Appl. No.: 14/746,122

(22) Filed: Jun. 22, 2015

(65) Prior Publication Data

US 2016/0374178 A1    Dec. 22, 2016

(51) Int. Cl.
H05B 33/08    (2006.01)
H05B 37/02    (2006.01)

(52) U.S. Cl.
CPC ..... H05B 37/0227 (2013.01); H05B 33/0869 (2013.01); *Y02B 20/341* (2013.01)

(58) Field of Classification Search
None
See application file for complete search history.

(56) References Cited

U.S. PATENT DOCUMENTS

| | | | |
|---|---|---|---|
| 6,608,614 B1 | 8/2003 | Johnson | |
| 7,236,105 B2 * | 6/2007 | Brenner | B64D 47/06 340/815.45 |
| 7,333,011 B2 * | 2/2008 | Singer | H05B 33/0869 340/12.32 |
| 7,498,753 B2 | 3/2009 | McAvoy et al. | |
| 7,883,226 B2 * | 2/2011 | Li | F21V 5/00 362/800 |
| 7,950,832 B2 * | 5/2011 | Tanaka | F21V 5/04 362/311.02 |

(Continued)

FOREIGN PATENT DOCUMENTS

| | | |
|---|---|---|
| EP | 2740667 A2 | 6/2014 |
| WO | 2010067292 A2 | 6/2010 |

OTHER PUBLICATIONS

Extended European Search Report, for European Patent Application No. 16175503.8, dated Nov. 16, 2016, 8 pages.

*Primary Examiner* — Douglas W Owens
*Assistant Examiner* — Jianzi Chen
(74) *Attorney, Agent, or Firm* — Kinney & Lange, P.A.

(57) ABSTRACT

In a lighting system that emits light of a color within a color specification, the color is controlled by adding light from a single color-correcting light emitting device (light-emitting device) to a primary light-emitting device. In an illustrative embodiment, a color-detecting module can sense the color of the combined light emitted from both the primary and the color-correcting light-emitting devices. The color-control system can generate an amplitude control signal based on a signal indicative of the color sensed by the color-detecting module. A color range of the combined light of the primary and the color-correcting light-emitting devices can intersect a domain of the predetermined color specification, as the generated amplitude control signal spans the domain. Using a single color-correcting light-emitting device to maintain a lighting system's emitted color within a predetermined color specification can advantageously reduce system complexity.

17 Claims, 6 Drawing Sheets

(56) References Cited

U.S. PATENT DOCUMENTS

| | | | | |
|---|---|---|---|---|
| 8,847,513 | B2* | 9/2014 | Van De Ven | H05B 33/086 |
| | | | | 315/151 |
| 8,974,087 | B2* | 3/2015 | Moeck | F21S 10/02 |
| | | | | 362/277 |
| 2008/0062070 | A1* | 3/2008 | De Oto | H05B 33/0848 |
| | | | | 345/46 |
| 2011/0241552 | A1* | 10/2011 | Ter Weeme | H05B 33/0869 |
| | | | | 315/152 |
| 2011/0309755 | A1* | 12/2011 | Wirth | H05B 33/0872 |
| | | | | 315/151 |
| 2014/0160774 | A1* | 6/2014 | Lapujade | B64D 47/06 |
| | | | | 362/470 |

* cited by examiner

LIGHTING-SYSTEM COLOR-SHIFT DETECTION AND CORRECTION

BACKGROUND

Various lighting applications require a lighting device to emit a color of a specific hue. In the theater, various colored lights can be used to set the mood of a scene or act. Photographic studios can use different lighting filters to provide an illumination source that complements the subject being photographed. Traffic control lamps use specific colors to indicate the current and near future traffic pattern of intersections. Automobiles have a specific hue of red for brake lights and tail lights. Low-beam and high-beam head lights are required to be within a white color specification. And parking lights have a yellow color specification. Aircraft also have various specifically-colored lights to indicate various things. Even color computer monitors can be calibrated to specific color standards.

The color of a light can drift due to various conditions. The color might change during the lifetime of a particular lamp, for example. Color may change in response to the applied voltage or current to an electrical lamp. Color may change due to wear of a lamp's lens or filter. And color may change when one or more constituent lighting elements of a collective group of elements fails. A color change, due to any reason, can cause a lighting system to fall outside of its color specification.

SUMMARY

Apparatus and associated methods relate to a lighting system for emitting light of a color within a predetermined color specification. The lighting system includes a primary light-emitting device configured to emit light of a first color. The lighting system includes a single color-correcting light-emitting device configured to emit light of a second color. The light emission of the color-correcting light-emitting device combines with the light emission of the primary light-emitting device. The lighting system includes a color-detecting device that detects a color of the combined emissions from the primary light-emitting device and the single color-correcting light-emitting device. The lighting system further includes a color-control system configured to receive a signal indicative of the detected color from the color detector. The color-control system generates an amplitude-control signal that controls an amplitude of the light emitted from the single color-correcting light-emitting device such that the detected color of the combined light emission is within the predetermined color specification.

In an exemplary embodiment, a method of correcting a color of an indicating light includes emitting light from a primary light-emitting device. The method includes combining light from a single color-correcting light-emitting device with the light emitted from the primary light-emitting device. The method includes detecting a color of the combined emissions from the primary light-emitting device and the single color-correcting light-emitting device. The method further includes generating a signal that controls an amplitude of the light from the single color-correcting light-emitting device. The generated signal is based on the detected color from the color-detecting device. The generated signal causes the color of the combined light emission to be within a predetermined color specification.

DETAILED DESCRIPTION

Figure 1:
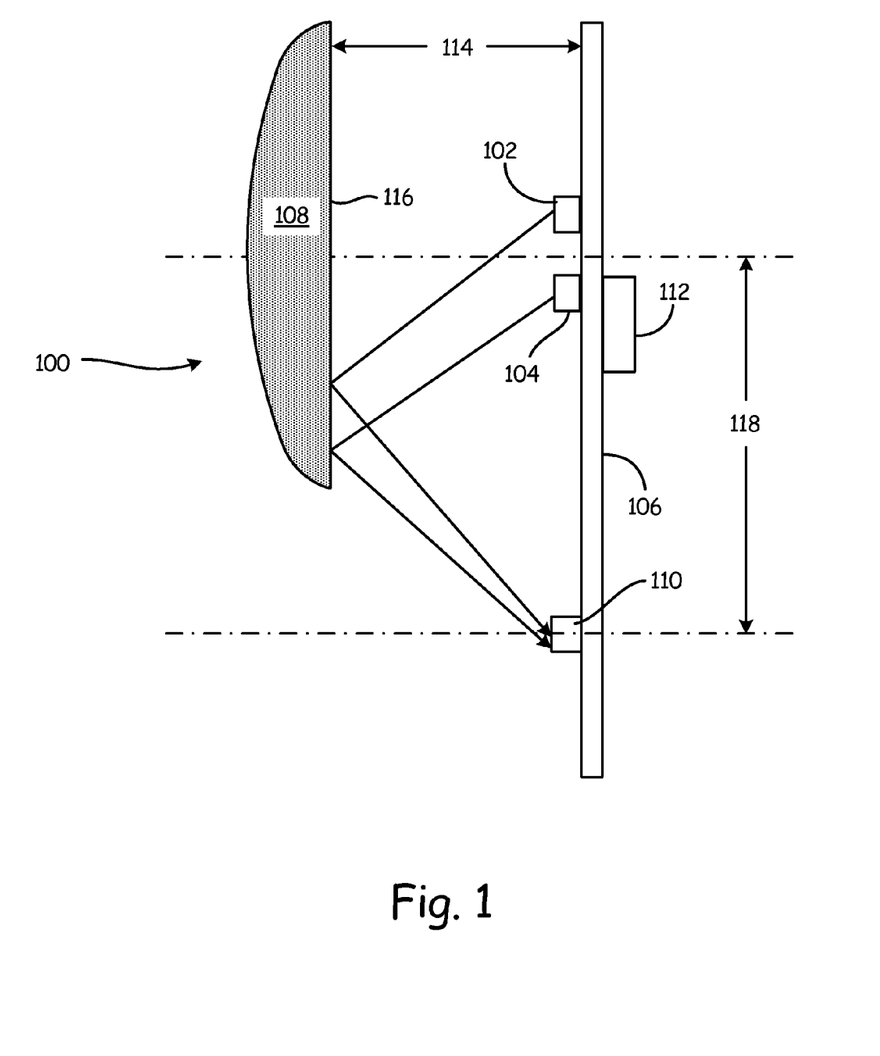
FIG. 1 is a schematic diagram of an exemplary color-corrected lighting system.

In this specification, an exemplary method of controlling a color emission of a lighting system will be disclosed using a single color-correcting light-emitting device. First, with reference to a simplified schematic diagram shown in FIG. 1, an exemplary controlled-color lighting system will be described. In FIG. 1, various components of the disclosed controlled-color lighting system will be detailed. Then, with reference to FIG. 2, an exemplary drifting color track of a primary light-emitting device will be described. The drifting color track will then be corrected by adding a controlled intensity of light emitted by a single color-correcting light-emitting device. Then, with reference a block diagram depiction in FIG. 3, other exemplary lighting systems with color-controlled light emission will be described. Exemplary color specifications will be described, with reference to FIG. 4. Finally, detailed color-controlling methods and design tradeoffs will be discussed, with reference to FIGS. 5-6.

FIG. 1 is a schematic diagram of an exemplary color-corrected lighting system. In FIG. 1, exemplary color-correcting lighting system 100 includes primary light-emitting device 102 and color-correcting light-emitting device 104, substrate 106, lens 108, color-detection module 110, and control system 112. In the depicted embodiment, primary 102 and color-correcting 104 light-emitting devices are mounted on substrate 106. Color-detection module 110 and control system 112 are also mounted on substrate 106. Each of primary 102 and color-correcting 104 light-emitting devices can emit light that is focused by lens 108. In some embodiments, distance 114 between lens 108 and light-emitting devices 102, 104 can be substantially equal to a focal length of lens 108, for example.

Color-detection module 110 can be oriented and located in such a way as to be able to receive or sample the combined emission of primary light-emitting device 102 and color-correcting light-emitting device 104. In the depicted embodiment, color-detection module 110 is spaced laterally from primary 102 and color-correcting 104 light-emitting devices. A portion of the combined light emitted from primary 102 and color-correcting 104 light-emitting devices is reflected from back surface 116 of lens 108. Color-detection module 110 may control the amplitude of light emitted from one of primary 102 and color-correcting 104 light-emitting devices. Such amplitude control of a single light-emitting device may be used to maintain the detected color to within a predetermined specification.

Controlling the color of a lighting system using such methods or apparatus can have one or more advantages. For example, controlling a color of a lighting system using amplitude control of a single light-emitting device can improve product performance and/or reduce system complexity. In some embodiments, reduced system complexity can improve system response time, for example. In various embodiments, reducing system complexity can reduce manufacturing complexity, component counts, and/or development time. Any one of such reductions can in turn reduce costs, for example. And such cost reductions can include one or more of development costs, component costs, product costs, and maintenance costs, for example. In an illustrative embodiment, a color-correcting lighting system can help ensure that the lighting system operates within a color specification for a longer period of time than would otherwise be possible.

Various optical systems may be used to control the light emitted from a color-corrected lighting system 100. In some embodiments, substantially all of the light emitted from primary and/or color-correcting light-emitting devices 102, 104 that is incident upon lens 108 can be transmitted through, absorbed by, or reflected by lens 108. Visible-light lenses can be made of materials, such as, for example, glass that can have low absorption coefficients (e.g., <<1). Some visible-light lenses can have a coating that lowers a reflection coefficient and/or that enhances a transmission coefficient of the lenses. But, even if lens 108 has such a coating, a portion, albeit maybe a small one, of the incident light can be reflected from lens 108.

Various ways of detecting the color of a color-corrected lighting system 100 may be performed. The reflection from surface 116 of lens 108 can be a function of the angle of incidence of the light upon surface 116. For example, if the angle of incidence is near zero (e.g., substantially normal to surface 116 of lens 108), the reflection coefficient could be modest or small. In some embodiments, the reflection coefficient increases as the angle of incidence increases. In such embodiments, locating color-detection module 110 at lateral distance 118 sufficiently distal from the combined light sources 102, 104 may maximize the angle of incidence and thereby maximize the reflection coefficient. In the depicted embodiment, reflecting surface 116 of lens 108 is substantially-flat. In some embodiments, both surfaces of a lens could be curved. In such embodiments, color-detection module 110 can receive light reflected from a curved surface of lens 108, for example.

To better understand the theory behind controlling color by control of an amplitude of a single-colored light-emitting device, a brief expository of color models follows. A retina of the human eye has two different kinds of light sensitive cells: i) cone cells and ii) rod cells. Cone cells can be divided into three kinds, each having a different spectral sensitivity. A first kind of cone cell has a peak response to relatively long wavelengths of visible light and is designated an L type cone ('L' for long wavelength). A second kind of cone cell has a peak response to relatively short wavelengths of visible light and is designated an S type cone ('S' for short wavelength). And a third kind of cone cell has a peak response to medium wavelengths of visible light and is designated an M type cone ('M' for medium wavelength). The rod cells have a relatively monochromatic response and are important in low light conditions, but assist little, if at all, in the detection of color.

All three kinds of cone cells will generate a signal in response to an incident light signal. Both intensity and hue can be determined from the three independent signals generated by the three different kinds of cone cells. These three independent response signals can provide a human brain the necessary information to determine both a color and an intensity of a light signal incident upon the human eye. Different mathematical color models can mimic the responses of the three different kinds of cone cells. Such a color model can use three independent variables to map a light signal into both a color metric and an intensity metric. Some color models divide these three independent variables into one variable that represents the intensity metric, and two variables that represent the color metric. In some models, these independent variables can be assigned values similar to or as linear combinations of the independent response signals generated by cone cells of a human eye.

Some color models can separate the three independent degrees of freedom associated with the three independent variables into two separate classes: i) one degree of freedom (e.g., corresponding to one of the variables) for indicating luminance (e.g., brightness); and ii) two degrees of freedom (e.g., corresponding to two of the independent variables) for indicating chromaticity (e.g., color or hue). One way of doing this is to first determine the overall magnitude of the three cone response signals (or the LMS signals). This overall magnitude can be used as indicative of the luminance. Second, one can normalize the cone response signals (e.g., by dividing each cone response signal by the determined magnitude). The three normalized cone response signals can, for example, be normalized such that their sum is equal to unity. Then, one can select any two of the normalized response signals as indicative of the color (the third normalized response being dependent upon the other two—e.g., z=1−x−y). Thus, these two selected normalized cone response signals can be uses as two independent degrees of freedom that span a chromaticity (or hue) space of a color model.

One such model of color that is sometimes used is called the 1931-CIE xy-chromaticity model. This model uses three basis functions that are similar to the three response functions of the different types of cone cells. Each of the response functions generates a signal indicative of its particular response to a light signal. The variables X, Y, and Z are used to represent the three different response signals, which generally correspond to the L, M, and S cone response signals, respectively. Each of the generated signals is then normalized by dividing each of the generated signals by the sum of the three generated signals. The normalized response signals are represented by the lower case variables, x, y, and z. The x and y normalized response signals are then selected and used to indicate the chromaticity of the lighting signal.

Figure 2:
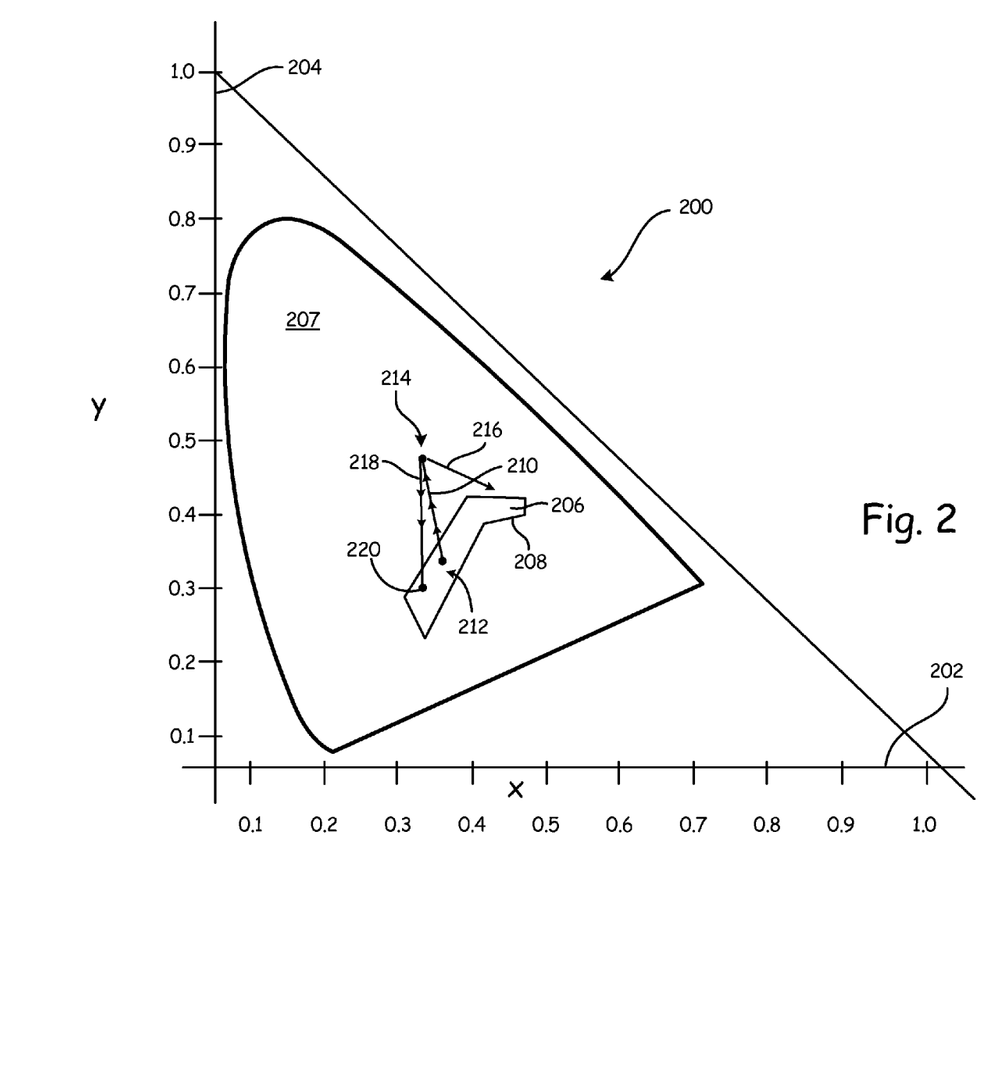
FIG. 2 is an xy-chromaticity diagram showing how a drifting color of a primary light-emitting device can be corrected by a single color-correcting light-emitting device.

One such exemplary color model will now be used to describe how a color can be controlled using only a single light-emitting device. FIG. 2 is an xy-chromaticity diagram showing how a drifting color of a primary light-emitting device can be corrected by a single color-correcting light-emitting device. In FIG. 2, xy-chromaticity diagram 200 has horizontal axis 202 that represents a first independent color-response signal. The first independent color-response signal, in this depiction, can be related to a long wavelength response signal, such as, for example, a response of an L-type cone cell. Thus, as one travels toward increasing x-axis values, colors that appear red to a human observer will be encountered. Xy-chromaticity diagram 200 has vertical axis 204 that represents a second independent color-response signal. The second independent color-response signal, in this depiction, can be related to a medium wavelength response signal, such as, for example, a response of an M-type cone cell. Thus, as one travels toward increasing y-axis values, colors that appear more green to a human observer will be encountered.

Xy-chromaticity diagram 200 has color specification region 206 within a gamut of human-perceivable colors 207. Color-specification region 206 is represented by a closed figure circumscribed by color-specification boundary 208. An area enclosed by color-specification boundary 208 can represent all colors that meet specific color criteria. And areas outside of color-specification boundary 208 can represent all colors that do not meet the specified color criteria. Also depicted on xy-chromaticity diagram 200 is color track 210 indicative of a measured color of an exemplary primary light-emitting device. Color track 210 can represent a series of measurements taken over time. As the primary light-emitting device ages, the color of light emitted by the primary light-emitting device, as represented by color track 210, can drift from initial xy-chromaticity value 212 to final xy-chromaticity value 214. Initial xy-chromaticity value 212 can have once been within color specification boundary 208. But as the primary light-emitting device aged, the emitted color drifted along color track 210, crossed color-specification boundary 212, and then left color-specification region 206.

To bring the color emission of the exemplary lighting system back into specification, a color-correcting light-emitting device can be used. The color-correcting light-emitting device can be of a color that, when added to the primary light-emitting device, can cause the color of the combined emission to return to color-specification region 206. Two different color-correction vectors 216, 218 are depicted in FIG. 2. An addition of color of light emitted from a red color-correcting light-emitting device can result in the color of the combined primary and color-correcting light-emitting devices to be corrected in red-correcting-vector 216 direction, for example. An addition of light emitted from a blue color-correcting light-emitting device can result in the color of the combined primary and color-correcting light-emitting devices to be corrected in blue-correcting-vector 218 direction, for example. In depicted xy-chromaticity diagram 200, either the red or blue color-correcting light-emitting devices can return the xy-chromaticity values of the combined light emitted from the lighting system to within color-specification region 206.

Notice that color-correcting vector 216 of the red color-correcting light-emitting device is pointing at an angle of approximately seventy degrees from the direction of drift along color track 210 of the primary light-emitting device. Although the combined emission has been returned to color-specification region 206 by the red color-correcting light-emitting device, the resulting xy-chromaticity value of the combined light emission is not proximate initial xy-chromaticity value 220 of the primary light-emitting device before color drifting began. If the color of the primary light-emitting device continues to drift, the red color-correcting light-emitting device can eventually become incapable of returning the color of the light emission of the combined primary and color-correcting light-emitting device to within color-specification region 206.

Now compare and contrast the correcting capability of the blue color-correcting light-emitting device to that of the red color-correcting light-emitting device described above. Notice, that color-correcting vector 218 of the blue color-correcting light-emitting device makes an angle with the drift direction that is substantially anti-parallel (e.g., about 180 degrees). Using such oriented color-correcting vector 218 can permit the combined light emission of the color-corrected signal to be proximate initial xy-chromaticity value 220 of the primary light-emitting device before color drifting began. Because color-correcting vector 218 of the blue color-correcting light-emitting device is substantially anti-parallel with the drifting direction, the blue color-correcting light-emitting device can continue to ensure that the color of the combined light emission remains within color-specification region 206 as the primary light-emitting device continues to drift in the drifting direction.

Figure 3:
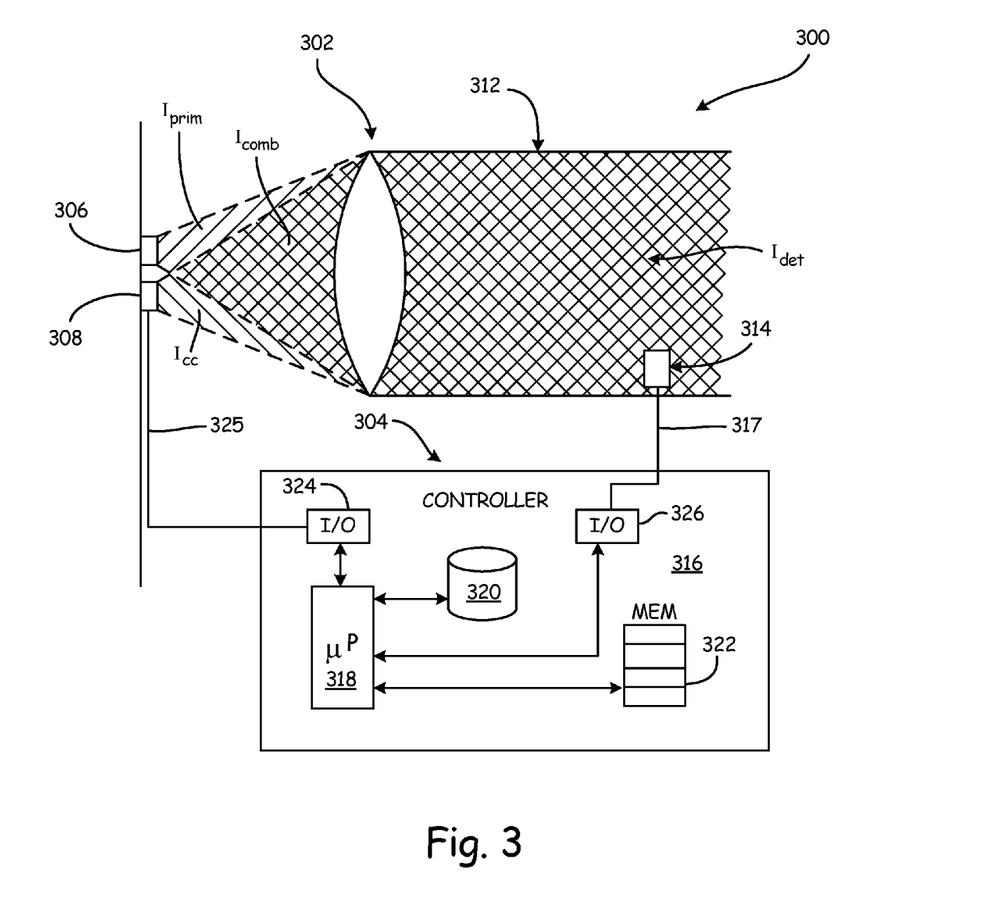
FIG. 3 is a block diagram of an exemplary color-correcting lighting system.

FIG. 3 is a block diagram of an exemplary color-correcting lighting system. In FIG. 3, exemplary color-correcting lighting system 300 includes optical system 302 and color-control system 304. Optical system 302 includes primary light source 306 and color-correcting light source 308. Primary 306 and color-correcting 308 light sources are adjacent to one another on common substrate 310. Optical system 302 has lens 318 for focusing light beam 312 emitted from primary and color-correcting light sources 306, 308.

Color-control system 304 includes color detector 314 and color-control module 316. Color detector 314 is positioned so as to intercept focused light beam 312 emitted from primary and color-correcting light sources 306, 308. Color detector 314 can then generate a signal indicative of a color of light beam 312 sensed by color detector 314. Color detector 314 can send the generated signal to color-control module 316, via detected-color signal line 317. Color-control module 316 can then receive the signal generated by and sent from color detector 314. Color control module 316 can then compare the received signal with a predetermined signal range associated with a color specification.

Color control module 316 has microprocessor 318, mass storage 320, memory 322 and input-output interfaces 324 and 326. Input-output interface 324 is in electrical communication with color-correcting light source 308, and input-output interface 326 is in electrical communication with color detector 314. Each of input-output interfaces 324, 326 is electrically coupled to microprocessor 318. Microprocessor 318 is electrically coupled to mass storage 320 and memory 322.

If the received signal is outside of the predetermined signal range associated with the color specification, the color-control module can generate a signal associated with a light amplitude of a predetermined color corresponding to the color-correcting light source. Microprocessor 318 can perform control instructions retrieved from program memory 322 to perform the steps of a method of correcting the combined color emitted from primary and color-correcting light sources 306, 308. Microprocessor 318 can receive a signal representative of a detected color from color detector 314 via input-output interface 326. Microprocessor can compare the detected color with a color specification. The color specification may be stored in mass storage 320 and/or memory 322. If the detected color is outside the color specification, microprocessor 320 can calculate a color-correction intensity that would bring the detected color into the color specification. Microprocessor can then send an amplitude signal corresponding to the calculated color-correction intensity to the color-correcting light source 308 via input-output interface 324, and amplitude-control signal line 325.

In some embodiments, the generated signal associated with the light amplitude of the predetermined color can be generated by a control loop (e.g., a Proportional-Integral-Derivative or PID control loop). In some embodiments, the signal associated with the light amplitude of the predetermined color can be generated based on the signal received from the color detector. In some embodiments, the generated signal can be calculated based on a relative distance between the color coordinates of the received signal and the color coordinates of a desired color signal. In an illustrative embodiment, the generated signal can be calculated based on a color coordinate distance between the received signal and the color corresponding to the color-correcting light source. For example:

$$I_{cc} = \frac{\sqrt{(x_{targ} - x_{det})^2 + (y_{targ} - y_{det})^2}}{\sqrt{(x_{cc} - x_{det})^2 + (y_{cc} - y_{det})^2}} I_{comb}$$

Here, $I_{cc}$ is the generated signal associated with the light amplitude (e.g., luminance) of the predetermined color of the color-correcting light source. $I_{comb}$ is the light amplitude (e.g., luminance) of the light detected by the color detector. The $x_n$ and $y_n$ designate independent color coordinates used in a color model to indicate the color (e.g., hue) of the detected, primary, color-correcting, or target color (e.g., indicated by det, prim, cc, or targ, respectively).

In some embodiments, the amplitude signal calculated by the color-control module can be generated in an open-loop fashion. In some embodiments, the amplitude signal calculated by the color-control module can be generated in a closed-loop fashion. In various embodiments, various color models for expressing a detected, color-correction, or target color can be used.

Figure 4:
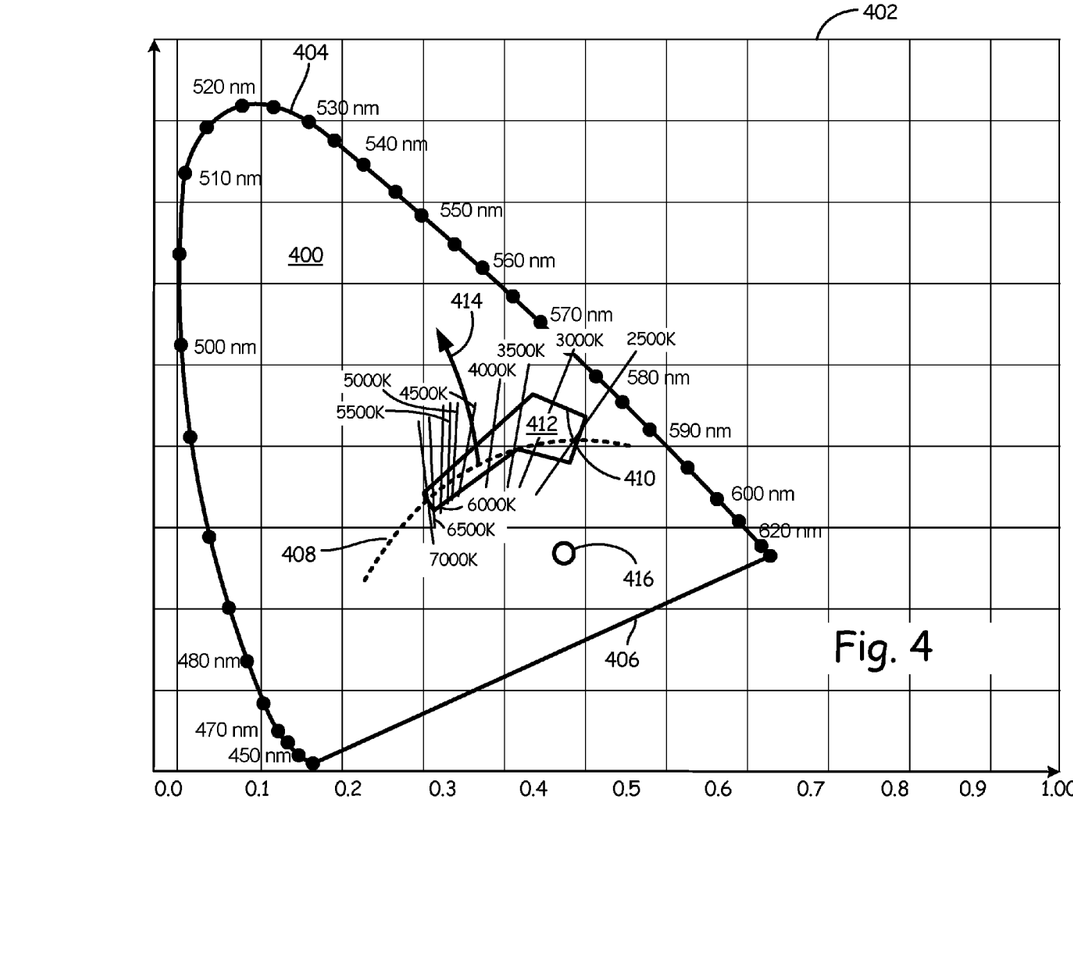
FIG. 4 is an xy-chromaticity diagram showing an exemplary aviation white color specification with respect to an exemplary black-body radiation color domain.

FIG. 4 is an xy-chromaticity diagram showing an exemplary aviation-white color specification with respect to an exemplary black-body radiation color domain. In FIG. 4, gamut of human observable colors 400 is shown on graph 402 using a CIE-1931 xy-chromaticity standard for representing colors. In the graph, the perimeter of human observable gamut 400 is bounded by curved-edge portion 404 and straight-line portion 406. Curved-edge portion 404 of gamut 400 can be called the spectral locus and can correspond to monochromatic light (each point representing a pure hue of a single wavelength), with annotated wavelengths listed in nanometers. Thus, as one travels from the long wavelength locations to the short wavelength locations around the curved-edge portion of the gamut, one will encounter the colors of the rainbow from red to indigo (e.g., Red, Orange, Yellow, Green, Blue, Violet, Indigo or ROYGBIV). Straight-line portion 406 on the lower part of gamut 400 can be called the line of purples. These colors on the line of purples can have no counterpart in monochromatic light.

If one chooses any two points of color on the depicted xy-chromaticity diagram, then all the colors that lie on a straight line between the two points can be formed by mixing these two chosen colors. We can call this model linear, when all combined colors lie on such a straight line. However, an equal mixture of two equally-bright colors might not generally lie on the midpoint of that line segment using this color-mapping model. We can say that this model does not preserve proportionality when the midpoint is not achieved by equal measures of two sources. In some color-mapping models, proportionality can be better preserved, though. When correcting colors that are near to one another, however, some degree of proportionality can prevail, even using such non-proportionality-preserving models. When using non-proportionality-preserving models, the path along which light emitted by the primary source drifts can be characterized so that open-loop color-control can be employed, for example.

Exemplary color track 408 of a black-body illumination source is depicted on graph 402. Black-body color track 408 is annotated as to a temperature of the black body. Aviation-white region 410 can be specified to intersect a portion of color track 408 of a black-body illumination source, for example.

Graph 402 also has color specification 412 of a primary light source and color-track vector 414 associated with the primary light source so specified. The color-track vector can be indicative of the direction of the color emitted by the primary source as the primary source ages, for example. In some embodiments a color track can be indicative of a range of colors of light emitted by the primary source as a function of a temperature of operation of the primary source. In some embodiments, color-correction can be used to correct for a primary source operating at different temperatures. In some embodiments, the color track associated with another variable of operation can be used and/or corrected. Finally, graph 402 shows specific color 416 associated with a color correcting light-emitting device. Various embodiments can use different colors of color correcting light-emitting devices. For example, in an exemplary embodiment, a color correcting LED might be of a color close to the spectrum locus region about 595 to 620 nm.

Figure 5:
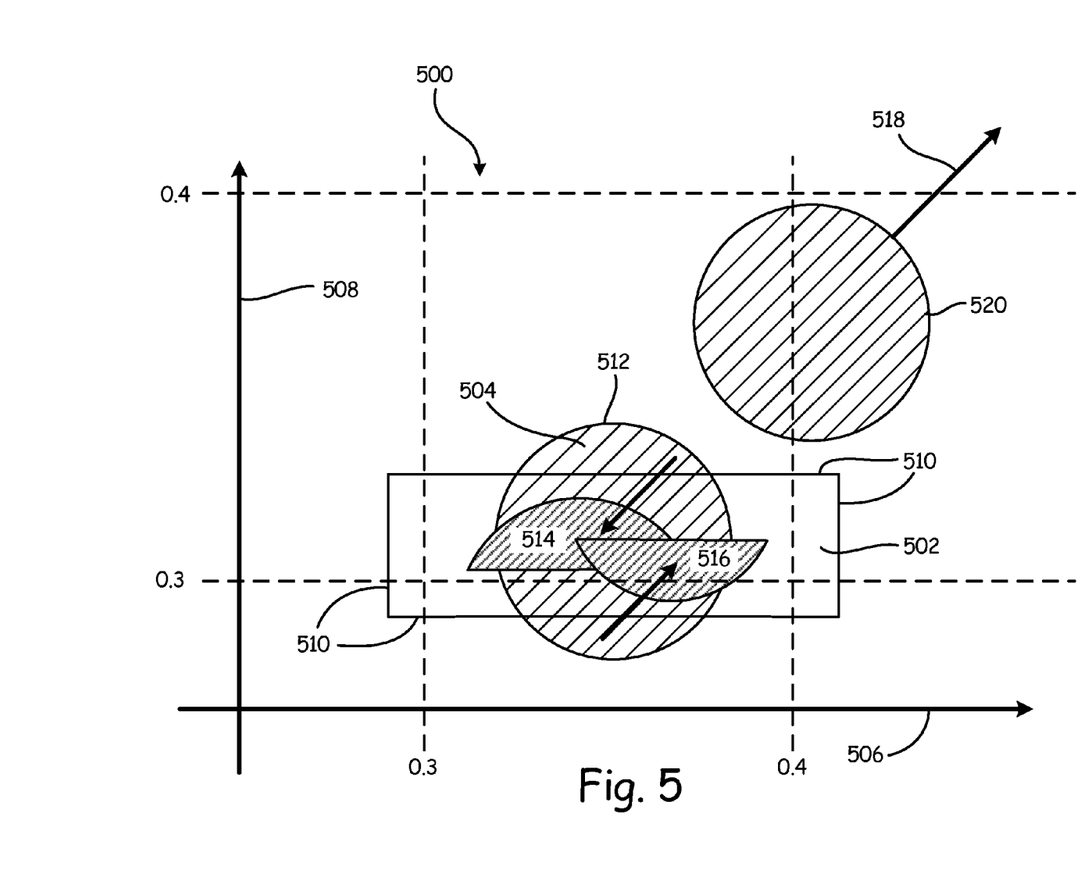
FIG. 5 is local region of an xy-chromaticity diagram depicting an exemplary coordinate relationship between a system color specification and a primary light source's color.

FIG. 5 is local region of an xy-chromaticity diagram depicting an exemplary coordinate relationship between a system color specification and a primary light source's color. In FIG. 5, graph 500 depicting exemplary target color specification 502 and exemplary primary-light-source specification 504. Both target color specification 502 and primary-light-source specification 504 are given in the xy-chromaticity coordinate system. Horizontal axis 506 represents the x coordinate of the xy-chromaticity coordinate system. Vertical axis 508 represents the y coordinate of the xy-chromaticity coordinate system.

In graph 500, target color specification 502 has rectangular boundaries 510. Primary-light-source specification 504 is shown as having substantially circular boundary 512. Notice that primary-light-source specification 504 in the depicted example is not wholly contained within target color specification 502. In such an exemplary situation, every member of a sample population of primarily light sources will not be within target color specification 502 without correcting the color of some of the members of the population. Without color-correction capability, manufactured systems can yield poorly. Portion 514 of the sample population would reside in a slice that resides just above (e.g., in the positive y-coordinate direction) target color specification 502, while another portion 516 of the sample population would reside just below (e.g., in the negative y-coordinate direction) target color specification 502.

But with color-correction capability, the yield can be improved. For example, if the primary source has drift vector 518 associated with a direction of color drift as the primary source ages, as indicated in graph 500, a specific predetermined color that can produce color-correction that is substantially anti-parallel to drift vector 518. Using such a color-correcting light source, at least top slice portion 514 can be corrected by adding light from the color-correcting light source to the primary light source. But subtracting light cannot be performed if the color correcting light source is off, because no negative light is impossible. Therefore, bottom slice portion 516 cannot be corrected if the uncorrected primary light source has a portion of the population so situated below the target-light-specification boundary.

But if the target light source has primary-light-source specification 520 that is wholly above the lower boundary of target color specification 502, then the whole of the population can be brought within the specification boundaries using a single unidirectional color-correcting light source.

Biasing the primary light source in this way can permit a lower cost solution. For example, a primary light source having a broad color specification can be used. Such a broadly specified light source can be smaller and/or lower cost than a precisely specified light source, for example.

Figure 6:
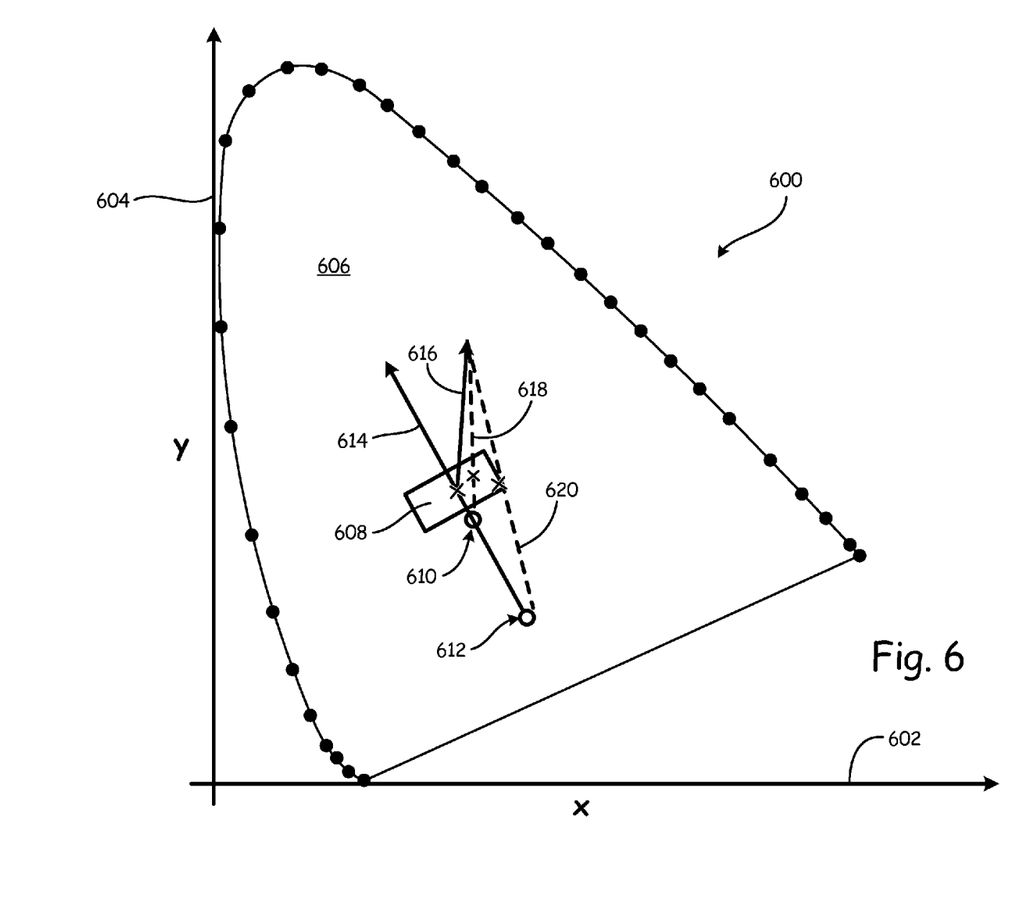
FIG. 6 is an xy-chromaticity graph depicting exemplary tradeoffs for using color-correcting light-emitting devices of two different colors.

FIG. 6 is an xy-chromaticity diagram depicting exemplary tradeoffs for using color-correcting light-emitting devices of two different colors. FIG. 6 depicts graph 600 having horizontal axis 602 and vertical axis 604. Horizontal axis 602 represents an x coordinate in the xy-chromaticity diagram. Vertical axis 604 represents a y coordinate in the xy-chromaticity diagram. Gamut of human-detectable colors 606 is shown in graph 600. Within gamut 606 is rectangular target color specification 608. Also depicted in graph 600 are two different xy-chromaticity coordinates 610, 612 corresponding to two different color-correcting light-emitting devices. The first color-correcting light-emitting device has xy-chromaticity coordinate 610 proximate to the target color specification 608. The second color-correcting light-emitting device has xy-chromaticity coordinate 612 distal to target color specification 608.

The second color-correcting light-emitting device can have more leverage to bring a drifting color of a primary light-emitting device within target color specification 608 than the first color-correcting light-emitting device, for example. A small amplitude of light emitted from the second color-correcting light-emitting device can move a drifting color a distance equal to that of a larger light amplitude from the first color-correcting light-emitting device. Using the second color-correcting light-emitting device can therefore correct for colors that drift a greater distance from the target color specification than if one would use the first color-correcting light-emitting device.

But the first color-correcting light-emitting device can have other advantages over the second color-correcting light-emitting device. For example, the primary light source can have a general direction of color drift. But each specific sample from the population of colors from a population spanning the entire color specification of the primary light source can have a unique color drift direction. Two different drift paths 614, 616 are shown on graph 600. If the color of the primary light source drifts in direction 614 antiparallel to the color correction direction of both the first and second color-correcting light-emitting devices, then both the first and second color-correcting light-emitting devices can be equally capable of correcting the color of the light emitting system to within target color specification 608. The color-correcting direction can be determined by the vector originating on the xy-chromaticity coordinates of the primary light-emitting device and terminating on xy-chromaticity coordinates 610, 612 of the color-correcting light-emitting device.

But if the color of the primary light source drifts along drift path 616 of color correcting vector 618 associated with the first color-correcting light-emitting device intersects target color specification 608 better than color-correcting vector 620 associated with the second color-correcting light-emitting device. Although the first color-correcting light-emitting device can have less ability than the second color-correcting light-emitting device to correct for colors drifted far from the color specification, it can be more tolerant of disparate drift paths of different primary light-emitting devices than the second color-correcting light-emitting device.

Various other embodiments can have various advantages. For example, various embodiments can have various different optical elements. For example, some optical systems can have one or more lenses. Some optical systems can use mirrors instead of and/or in addition to lenses. In an exemplary embodiment, a portion of a lens can be coated with a reflective coating at a predetermined region so as to improve the reflection of light directed toward a color-detection module. In some embodiments, a lens and/or mirror can be molded to a light emitting device. In some embodiments the lens and/or mirror can be separate from the light emitting device.

In some embodiments, the light-emitting device can be an incandescent lamp. In some embodiments, the light-emitting device can be a light-emitting diode. In an exemplary embodiment a light-emitting device can be a laser. Various fluorescent, gas discharge or arc lamp illuminating devices can be used. The same or different types of light-emitting device can be used for a primary light source and a color-correcting light source.

Various embodiments can employ various means for controlling an xy-chromaticity value of light emitted from the lighting system, ($x_{comb}$, $y_{comb}$), of the combined emission of the primary light-emitting device and the single color-correcting light-emitting device to be within the predetermined region of xy-chromaticity values. In some embodiments, controlling means can include a detecting module. In some embodiments, controlling means can include a color controller. In some embodiments, a color can be controlled by measuring an uncorrected color, determining an amplitude of light of a color emitted from a color-control light-emitting device and then controlling the color-control light-emitting device so that it emits light of the determined amplitude.

The following are non-exclusive descriptions of possible embodiments of the present invention.

A lighting system for emitting light of a color within a predetermined color specification includes a primary light-emitting device configured to emit light of a first color. The lighting system includes a single color-correcting light-emitting device configured to emit light of a second color. The light emission of the color-correcting light-emitting device combines with the light emission of the primary light-emitting device. The lighting system includes a color-detecting device that detects a color of the combined emissions from the primary light-emitting device and the single color-correcting light-emitting device. The lighting system further includes a color-control system configured to receive a signal indicative of the detected color from the color detector. The color-control system generates an amplitude-control signal that controls an amplitude of the light emitted from the single color-correcting light-emitting device such that the detected color of the combined light emission is within the predetermined color specification.

A further embodiment of the foregoing lighting system, wherein the color specification can correspond to any one of: an aviation-white color specification, aviation-green color specification, or aviation-red color specification. A further embodiment of any of the foregoing lighting systems, wherein the second color can correspond to any of: a red color or a blue color. A further embodiment of any of the foregoing lighting systems, wherein, when the primary light-emitting device ages, an xy-chromaticity value of the light emission of the primary light-emitting device can drift in a xy-chromaticity direction defined by a non-zero direction vector: ($x_{drift}$, $y_{drift}$). A further embodiment of any of the foregoing lighting systems, wherein a dot product of the xy-chromaticity drift direction, ($x_{drift}$, $y_{drift}$), and the xy-chromaticity correction direction, defined as ($x_{cc}-x_{prim}$, $y_{cc}-y_{prim}$), can be negative. Here, the cc and prim subscripts identify that these chromaticity values correspond to the color-correcting and the primary light-emitting devices, respectively. A further embodiment of any of the foregoing lighting systems, wherein an angle between the xy-chromaticity drift direction, ($x_{drift}$, $y_{drift}$), and an xy-chromaticity correction direction, defined as ($x_{cc}-x_{prim}$, $y_{cc}-y_{prim}$), can be greater than 90 or 135 degrees. A further embodiment of any of the foregoing lighting systems, wherein an xy-chromaticity value of the color-correcting light-emitting device can satisfy the following relation: ycc<0.04+0.36xcc. A further embodiment of any of the foregoing lighting systems, wherein an xy-chromaticity value of the color-correcting light-emitting device satisfies the following relation: ycc can be less than 0.4 or 0.3.

A method of correcting a color of an indicating light includes emitting light from a primary light-emitting device includes combining light from a single color-correcting light-emitting device with the light emitted from the primary light-emitting device. The method includes detecting a color of the combined emissions from the primary light-emitting device and the single color-correcting light-emitting device. The method further includes generating a signal that controls an amplitude of the light from the single color-correcting light-emitting device. The generated signal is based on the detected color from the color-detecting device. The generated signal causes the color of the combined light emission to be within a predetermined color specification.

A further embodiment of the foregoing color-correcting method, wherein the predetermined color specification can correspond to an aviation-white color specification. A further embodiment of any of the foregoing color-correcting methods, wherein, when the primary light-emitting device ages, an xy-chromaticity value of the light emission of the primary light-emitting device drifts in a xy-chromaticity direction defined by a non-zero direction vector: ($x_{drift}$, $y_{drift}$). A further embodiment of any of the foregoing color-correcting methods, wherein an angle between the xy-chromaticity drift direction, ($x_{drift}$, $y_{drift}$), and an xy-chromaticity correction direction, defined as ($x_{cc}-x_{prim}$, $y_{cc}-y_{prim}$), is greater than 90 degrees.

A lighting system for emitting light of a color within a predetermined color specification includes a primary light-emitting device configured to emit light of a first color. The lighting system includes a single color-correcting light-emitting device configured to emit light of a second color, the light emission of the color-correcting light-emitting device combining with the light emission of the primary light-emitting device. The lighting system includes a color-correction system that corrects the color of light from the combined emissions from the primary light-emitting device and the single color-correcting light-emitting device to be within the color specification.

A further embodiment of the foregoing lighting system, wherein the color-correction system can include a color detector that produces a signal representative of the color of the combined emissions from the primary light-emitting device and the single color-correcting light-emitting device. A further embodiment of any of the foregoing lighting systems, wherein the color-correction system can include a controller that generates a signal that controls an amplitude of the light from the single color-correcting light-emitting device.

While the invention has been described with reference to an exemplary embodiment(s), it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A lighting system for emitting light of a color within a color specification, the lighting system comprising:
   a primary light-emitting device configured to emit light of a first color having an xy-chromaticity value of ($x_{prim}$, $y_{prim}$) in an xy-chromaticity diagram;
   a color-correcting light-emitting device configured to emit light of a second color having an xy-chromaticity value of ($x_{cc}$, $y_{cc}$), the second color being different from the first color, the light emission of the color-correcting light-emitting device combining with the light emission of the primary light-emitting device;
   a color-detecting device that detects a color of the combined emissions of the primary light-emitting device and the color-correcting light-emitting device, and generates a signal indicative of the detected color;
   a controller configured to receive the signal indicative of the detected color from the color-detecting device and to generate an amplitude-control signal that controls an intensity of the light emitted from the color-correcting light-emitting device such that the detected color of the combined light emission is within the color specification; and
   a lens having a partially reflective back surface proximate both the primary light-emitting device and the color-correcting light-emitting device, the lens aligned so that the partially reflective back surface of the lens reflects a reflected portion of the combined light emitted by the primary-emitting device and color-correcting light-emitting device upon the color detecting device.

2. The lighting system of claim 1, wherein the color specification corresponds to an aviation-white color specification.

3. The lighting system of claim 1, wherein the color specification corresponds to an aviation-green color specification.

4. The lighting system of claim 1, wherein the color specification corresponds to an aviation-red color specification.

5. The lighting system of claim 1, wherein the second color corresponds to a red color.

6. The lighting system of claim 1, wherein the second color corresponds to a blue color.

7. The lighting system of claim 1, wherein, when the primary light-emitting device ages, the xy-chromaticity value of the light emission of the primary light-emitting device drifts in an xy-chromaticity direction defined by a non-zero direction vector: ($x_{drift}$, $y_{drift}$).

8. The lighting system of claim 7, wherein a dot product of the xy-chromaticity drift direction, ($x_{drift}$, $y_{drift}$), and an xy-chromaticity correction direction, defined as a vector difference of the xy-chromaticity values of the first color and the xy-chromaticity value of the second color, represented by ($x_{cc}-x_{prim}$, $y_{cc}-y_{prim}$), is negative.

9. The lighting system of claim 7, wherein an angle between the xy-chromaticity drift direction, ($x_{drift}$, $y_{drift}$), and an xy-chromaticity correction direction, defined as a vector difference of the xy-chromaticity value of the first color and the xy-chromaticity value of the second color, represented by $(x_{cc}-x_{prim}, y_{cc}-y_{prim})$, is greater than 90 degrees.

10. The lighting system of claim 7, wherein an angle between the xy-chromaticity drift direction, $(x_{drift}, y_{drift})$, and an xy-chromaticity correction direction, defined as a vector difference of the xy-chromaticity value of the first color and the xy-chromaticity value of the second color, represented by $(x_{cc}-x_{prim}, y_{cc}-y_{prim})$, is greater than 135 degrees.

11. The lighting system of claim 1, wherein the xy-chromaticity value of the color-correcting light-emitting device satisfies the following relation: $y_{cc} < 0.04 + 0.36 x_{cc}$.

12. The lighting system of claim 1, wherein the xy-chromaticity value of the color-correcting light-emitting device satisfies the following relation: $y_{cc}$ is less than 0.4.

13. The lighting system of claim 1, wherein the xy-chromaticity value of the color-correcting light-emitting device satisfies the following relation: $y_{cc}$ is less than 0.3.

14. A method of correcting a color of an indicating light, the method comprising:
   emitting light of a first color from a primary light-emitting device, wherein the light of the first color has an xy-chromaticity value of $(x_{prim}, y_{prim})$;
   combining light of a second color from a single color-correcting light-emitting device with the light of the first color emitted from the primary light-emitting device, wherein the light of the second color has an xy-chromaticity value of $(x_{cc}, y_{cc})$;
   reflecting, by a partially reflective back surface of a lens proximate both the primary light-emitting device and the color-correcting light-emitting device, a portion of the combined light emitted by the primary light-emitting device and the single color-correcting light-emitting device;
   detecting, by a color-detecting device, a color of the combined portion of the light emitted by the primary light-emitting device and the single color-correcting light-emitting device reflected by the partially reflective surface of the lens; and
   generating a signal that controls an intensity of the light from the single color-correcting light-emitting device, the generated signal based on the detected color from the color-detecting device, the generated signal causing the color of the combined light emission to be within a predetermined color specification.

15. The method of claim 14, wherein the predetermined color specification corresponds to an aviation-white color specification.

16. The method of claim 14, wherein, when the primary light-emitting device ages, the xy-chromaticity value of the light emission of the primary light-emitting device drifts in an xy-chromaticity direction defined by a non-zero direction vector: $(x_{drift}, y_{drift})$.

17. The lighting system of claim 16, wherein an angle between the xy-chromaticity drift direction, $(x_{drift}, y_{drift})$, and an xy-chromaticity correction direction, defined as a vector difference of the xy-chromaticity values of the first color and the xy-chromaticity value of the second color, represented by $(x_{cc}-x_{prim}, y_{cc}-y_{prim})$, is greater than 90 degrees.

* * * * *